June 5, 1962   L. E. BERGGREN   3,037,388
CONDITION RESPONSIVE DEVICES
Filed Dec. 31, 1958
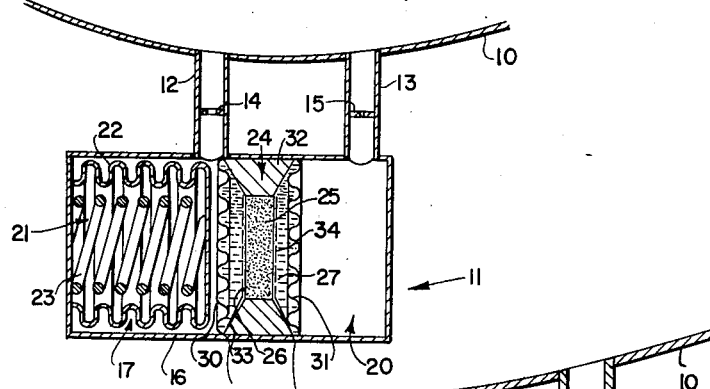
FIG 1
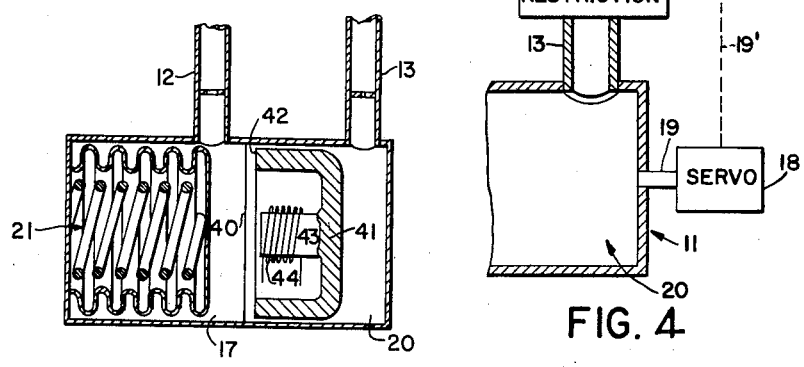
FIG 2
FIG. 4
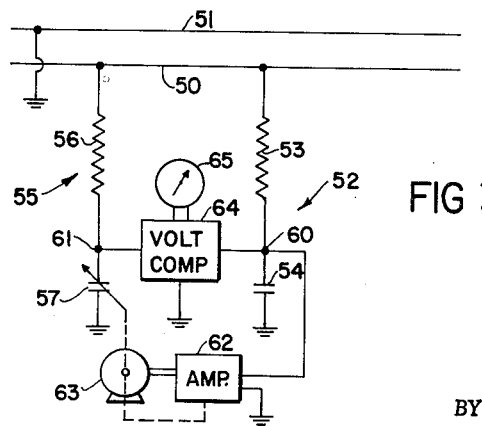
FIG 3
INVENTOR.
LLOYD E. BERGGREN
BY *George N. Field*
ATTORNEY

United States Patent Office 3,037,388
Patented June 5, 1962

3,037,388
CONDITION RESPONSIVE DEVICES
Lloyd E. Berggren, Minneapolis, Minn., assignor to Minneapolis-Honeywell Regulator Company, Minneapolis, Minn., a corporation of Delaware
Filed Dec. 31, 1958, Ser. No. 784,304
6 Claims. (Cl. 73—398)

This invention relates to the field of control apparatus and more particularly to apparatus for sensing the presence of excessive cyclic variation in a condition which ideally exhibits basically an aperiodic variation. The principle underlying the invention may be applied generally: the present specification discloses two illustrative applications of the invention, one where the condition is fluid pressure and one where the condition is voltage.

It sometimes happens that a condition which ideally is unchanging, or slowly changing in an aperiodic fashion, actually experiences cyclic change at some particular frequency or at a frequency within a determinable range. If the cyclic change is a small amount, it may often be ignored, but when its amplitude becomes significant compared to the instantaneous or aperiodic value of the condition, inconvenient or even dangerous results may follow. It is thus desirable to have means for determining not only the presence but the relative magnitude of any cyclic variaion in the aperiodically varying condition, and it is the object of this invention to provide means for performing both these functions, for use in either indicating or controlling systems.

Various other objects, advantages, and features of novelty not particularly enumerated above which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention.

In the drawing, FIGURE 1 shows a preferred embodiment of the invention applied to the sensing of cyclic variation in engine intake pressure, FIGURE 2 is a modification of FIGURE 1, FIGURE 3 shows a further embodiment of the invention applied to the sensing of alternating voltage on a direct voltage line, and FIGURE 4 is a fragmentary showing of a modification of FIGURE 1.

Referring now to FIGURE 1, the inlet duct of an aircraft jet engine is shown at 10 in partial cross section. The pressure in inlet duct 10 when the aircraft is in flight and the engine is operating properly is essentially constant, except for a slow, essentially aperiodic variation with changes in barometric pressure, aircraft velocity, engine operating point, and altitude, because the air in the duct normally exhibits steady flow characteristics. However under some undesirable conditions of engine operation and aircraft speed the air in duct 10 may take on nonsteady flow characteristics, referred to as "buzz," and the pressure in the duct then acquires a cyclic component made up of frequencies which are high relative to the normal variations of pressure due to altitude or barometric pressure changes, etc.

Empirical determinations have made it evident that when the amplitude of the buzz component of the pressure in duct 10 exceeds 20% of the aperiodic component, a dangerous condition exists. From this it follows, for example, that greater buzz amplitude can be tolerated near the ground than at high altitudes, and that an adequate buzz warning device must not only sense the presence of the buzz component, and its magnitude, but must also relate these to the aperiodic component, and perform its function when the former component becomes greater than 20 percent of the latter component.

I accomplish this by providing a buzz sensor 11 connected to duct 10 by a pair of tubes 12 and 13 having calibrated restrictions or orifices 14 and 15. A sensor body 16 has a first chamber 17, into which tube 12 opens, and second chamber 20, into which tube 13 opens. The volume of chamber 20 is essentially constant, while chamber 17 encloses an aneroid device 21 comprising an evacuated bellows 22 containing a compression spring 23. The system including bellows 22 and spring 23 has a certain degree of damping, and additional damping—by a dash pot for example—may be added if necessary: the desired arrangement is one in which the volume of the bellows varies with slowly varying pressure exerted thereon, but cannot follow rapid pressure variations.

Chambers 17 and 20 are separated by an electrokinetic cell 24 including a porous element 25 having grid electrodes 26 and 34 at opposite faces, and a pair of diaphragms 30 and 31, the porous element and the diaphragms being assembled to an annular frame 32. The spaces 33 and 27 between diaphragms 30 and 31 respectively and porous element 25 are filled with a suitable fluid such as acetonitrile. It is a characteristic of electrokinetic cells so constructed that when the fluid flows through the porous element a voltage appears between the electrodes which is proportional to the rate of fluid flow: since the rate of fluid flow is linearly proportional to the pressure difference, the voltage is also a measure of the pressure difference.

The volume of chamber 20 and the size of orifice 15 are so proportioned that the pressure in chamber 20 is essentially the average value or aperiodic component of the pressure in duct 10, the cyclic component thereof being almost completely attenuated. Neglecting for the moment the volume change made possible by compression of bellows 22, and considering the latter to be occupying its maximum volume corresponding to minimum anticipated pressure in duct 10, the volume of chamber 17 and the size of orifice 14 are so proportioned as to effect a predetermined minimum attenuation of the cyclic component of the pressure in duct 10. The pressure on the right of cell 24 is thus the aperiodic component only of the duct pressure, while that on the left of the cell includes an additional cyclic component. The cell output, as a measure of the instantaneous pressure difference, is thus a measure of the cyclic component.

Now if the aperiodic component increases in value, bellows 22 is compressed, thus increasing the volume of chamber 17. Orifice 14 remaining of the same size, the attenuation of the cyclic component is accordingly increased, to vary the pressure differential across cell 24. Thus if the average pressure increases the same cyclic component produces a smaller and smaller cell output, or a constant cell output represents a larger and larger amplitude of cyclic component. By appropriate design the change in volume of chamber 17 with change in aperiodic pressure component may be made such that a 20% cyclic component gives the same cell output over a wide range of values of the aperiodic component.

While orifice 15 is shown as of fixed size, I contemplate that by varying the size of this orifice with variation in the aperiodic component it may be possible to achieve a more reasonable schedule of volume of chamber 17 versus aperiodic pressure component, and thus ease the requirements on bellows size and stroke. Thus as shown in FIGURE 4, a variable restriction 15' such as a conventional needle valve may replace fixed restriction 15 in conduit 13, and may be operated through a mechanical connection 19' by a servo 18 connected to respond to the pressure in chamber 20 by a conduit 19.

It is not necessary to the practice of my invention that an electrokinetic cell be used as a sensing element, and I contemplate other expedients such as piezoelectric, capacitance, and magnetic pickups. FIGURE 2 illustrates the use of a magnetic pickup, but is otherwise like FIGURE 1. The chambers 17 and 20 of FIGURE 2 are separated by a diaphragm 40 of magnetic material, and chamber 20 is enlarged to make up for the volume of a pot type core 41 of ferromagnetic material having a perimeter 42 and a central stud 43 carrying a winding 44. Variation in the relative chamber pressures displaces diaphragm 40 with respect to core 41, thus changing the inductance of winding 44 to give an output comparable to the voltage output from cell 24 of FIGURE 1.

My inventive concept is not limited to pneumatic devices, and is illustrated in FIGURE 3 as applied to electric circuitry. Between a first conductor 50 and a second, grounded conductor 51 there is maintained a direct voltage which ideally has no alternating component in a given frequency band, but which under undesirable conditions may have such a component. A first filter 52 made up of resistor 53 and capacitor 54 in series is connected between conductor 50 and ground, and a second filter 55 made of a resistor 56 and a variable capacitor 57 in series is also connected between conductor 50 and ground. Filter 52 is so chosen that the voltage between the junction point 60 and ground is essentially unaffected by any alternating voltage component on conductor 50, while filter 55 is chosen to give minimum attenuation of the alternating voltage component at junction point 61. The voltage between point 60 and ground is supplied to a feedback amplifier 62 to energize a motor 63 which adjusts capacitor 57. Amplifier 62 and motor 63 of FIGURE 3 perform the function of bellows 22 and spring 23 in FIGURE 1. Points 60 and 61 are connected to a voltage comparator 64 which actuates a meter 65 in accordance with the difference in potential between points 60 and 61. Network components and amplifier characteristics may be so chosen that the meter indication remains essentially constant, for the condition where the alternating component is 20% of the direct current component, over a wide range of the latter.

Numerous objects and advantages of my invention have been set forth in the foregoing description, together with details of structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. Apparatus of the class described comprising, in combination: a first chamber; a second chamber, first conduit means including a first restriction for connecting said first chamber to an engine inlet duct so as to give substantially complete attenuation of cyclic pressures in said duct within a selected frequency range; second conduit means including a second restriction for connecting said second chamber to said duct; means varying the volume of said second chamber in accordance with the average pressure in said duct; and means connected to said chambers for giving a signal which is continuously representative of the instantaneous difference between the pressures in said chambers.

2. Apparatus of the class described comprising, in combination: a first chamber; a second chamber; first conduit means including a variable restriction for connecting said first chamber to an engine inlet duct so as to give substantially complete attenuation of cyclic pressures in said duct within a selected frequency range; second conduit means including a second restriction for connecting said second chamber to said duct; means varying the volume of said second chamber in accordance with the average pressure in said duct; means for varying the size of said variable restriction as a function of said average pressure; and means connected to said chambers for giving a signal which is continuously representative of the instantaneous difference between the pressures in said chamber.

3. A buzz sensor comprising a first chamber of fixed volume; a first input channel connected to said first chamber and including a first restriction; a second chamber; a second input channel connected to said second chamber and including a second restriction; an aneroid device within said second chamber; and an electrodynamic cell common to said chambers for giving an electric output representative of the instantaneous difference between the pressures in said chambers.

4. A buzz sensor comprising a first chamber of fixed volume; a first input channel connected to said first chamber and including a first restriction; a second chamber; a second input channel connected to said second chamber including a second restriction; an aneroid device within said second chamber; and pickoff means influenced by the pressures in said chambers to give an electric output representative of the instantaneous difference between said pressures.

5. An engine having an inlet duct; means connected to said duct for giving a first pressure, having a fixed relationship to the average pressure in said duct, and a second pressure, having a variable relationship to the instantaneous pressure in said duct; aneroid means in the first named means operative to vary said variable relationship in accordance with said average pressure; and means responsive to the instantaneous difference between said first and second pressures.

6. Means for detecting the proportion of any cyclic variation in a condition ideally exhibiting only substantially aperiodic variation comprising, in combination: fixed attenuating means for deriving from said condition a first signal continuously representative of substantially only the aperiodic component therein; variable attenuating means for deriving from the condition a second signal continuously representative thereof in which any cyclic component may be variably attenuated; means varying the last named means in accordance with the magnitude of said aperiodic component; and means connected to receive said signals for giving an output determined by the relation thereof.

References Cited in the file of this patent
UNITED STATES PATENTS

| | | |
|---|---|---|
| 2,226,545 | Blasig | Dec. 31, 1940 |
| 2,575,229 | Moore | Nov. 13, 1951 |
| 2,632,374 | Klemperer | Mar. 24, 1953 |
| 2,730,896 | Boisblanc | Jan. 17, 1956 |